United States Patent
Thejaswi et al.

(10) Patent No.: US 11,411,600 B2
(45) Date of Patent: Aug. 9, 2022

(54) PROCESSING OF UPLINK DATA STREAMS

(71) Applicant: Nokia Solutions and Networks Oy, Espoo (FI)

(72) Inventors: Chandrashekhar Thejaswi, Bangalore (IN); Suresh Kalyanasundaram, Bangalore (IN); Rajeev Agrawal, Glenview, IL (US); Francis Dominique, Sunnyvale, CA (US); Karthik Kuntikana Shrikrishna, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/291,456

(22) PCT Filed: Oct. 21, 2019

(86) PCT No.: PCT/EP2019/078509
§ 371 (c)(1),
(2) Date: May 5, 2021

(87) PCT Pub. No.: WO2020/094370
PCT Pub. Date: May 14, 2020

(65) Prior Publication Data
US 2022/0006485 A1 Jan. 6, 2022

(30) Foreign Application Priority Data
Nov. 6, 2018 (IN) .............................. 201841041969

(51) Int. Cl.
*H04B 1/71* (2011.01)
*H04B 1/7105* (2011.01)
(Continued)

(52) U.S. Cl.
CPC ..... *H04B 1/71055* (2013.01); *H04B 1/71057* (2013.01); *H04B 1/71075* (2013.01); *H04B 7/0452* (2013.01); *H04W 72/0413* (2013.01)

(58) Field of Classification Search
CPC ............ H04B 1/71055; H04B 1/71057; H04B 1/71075; H04B 7/0452; H04B 1/7105;
(Continued)

(56) References Cited

U.S. PATENT DOCUMENTS

2007/0105595 A1   5/2007   Prasad et al.
2010/0034151 A1   2/2010   Alexiou et al.
(Continued)

FOREIGN PATENT DOCUMENTS

EP       2873161 A1 *   5/2015   ............. H04B 7/024
WO   WO-2006133631 A1 *  12/2006   ............. H04J 11/005
WO   2016/139027 A1   9/2016

OTHER PUBLICATIONS

Li et al., "Reduced-complexity Detection Algorithms for Systems using Multi-element Arrays", Globecom '00—IEEE. Global Telecommunications Conference. Conference Record (Cat. No. 00CH37137), Nov. 27-Dec. 1, 2000, pp. 1072-1076.

(Continued)

*Primary Examiner* — Jean B Corrielus
(74) *Attorney, Agent, or Firm* — Joseph C. Drish; Harrington & Smith (57) ABSTRACT

An apparatus is disclosed, comprising means for identifying a plurality of user equipment (UE), each transmitting one or more uplink packets for decoding at a base station associated with a given cell of a radio network. The apparatus further comprises means for clustering the identified user equipment into joint processing groups, each joint processing group comprising the identities of two or more user equipment as clustered and means for performing, in a first processing stage, joint processing of the uplink data streams for identified user equipment within common joint processing groups using one or more first processing algorithms to produce corresponding first processed uplink data streams. The apparatus further discloses means for performing one or more subsequent processing stages on the first processed uplink data streams, subsequent to the joint processing, to produce decoded uplink data streams, the one or more subsequent processing stages using one or more second processing algorithms, different from the first processing algorithm.

17 Claims, 5 Drawing Sheets

(51) Int. Cl.
*H04B 1/7107* (2011.01)
*H04B 7/0452* (2017.01)
*H04W 72/04* (2009.01)

(58) Field of Classification Search
CPC ............... H04W 72/0413; H04J 11/005; H04J 11/0059; H04J 11/0046
See application file for complete search history.

(56) References Cited

U.S. PATENT DOCUMENTS

| | | |
|---|---|---|
| 2011/0045831 A1 | 2/2011 | Chiu et al. |
| 2011/0230224 A1 | 9/2011 | Larsson et al. |
| 2012/0314740 A1 | 12/2012 | Kwak et al. |
| 2014/0185564 A1 | 7/2014 | Dong et al. |
| 2014/0211687 A1* | 7/2014 | Yu .................... H04L 5/0032 370/315 |
| 2015/0103753 A1* | 4/2015 | Maddah-Ali ........ H04B 7/0617 370/329 |
| 2018/0234867 A1 | 8/2018 | Wang et al. |

OTHER PUBLICATIONS

Aoki et al., "Novel Reduced Complexity Algorithm based on Group Detection in Multiple Antenna Systems", IEEE 15th International Symposium on Personal, Indoor and Mobile Radio Communications (IEEE Cat. No. 04TH8754), Sep. 5-8, 2004, pp. 1444-1448.

Golub et al., "Matrix Computations", 3rd edition, JHU Press, 1996, 723 pages.

Tian et al., "Overlapping User Grouping in Iot Oriented Massive Mimo Systems", International Conference on Computing, Networking and Communications (ICNC), Jan. 26-29, 2017, 5 pages.

Shen et al., "Sieve: Scalable User Grouping for Large Mu-mimo Systems", IEEE Conference on Computer Communications (INFOCOM), Apr. 26-May 1, 2015, pp. 1975-1983.

Tibshirani et al., "Estimating the Number of Clusters in a Data Set Via the Gap Statistic", Journal of the Royal Stat. Soc. Series B., 2001, pp. 411-423.

Invitation to Pay Additional Fees and Partial Search Report received for corresponding Patent Cooperation Treaty Application No. PCT/EP2019/078509, dated Jan. 28, 2020, 14 pages.

Nguyen et al., "Parallel Group Detection Approach for Massive MIMO systems", International Conference on Advanced Technologies for Communications (ATC), Oct. 18-20, 2018, pp. 94-99.

Nguyen et al., "Efficiency Zero-forcing Detectors based on Group Detection for Massive MIMO Systems", International Conference on Advanced Technologies for Communications (ATC), Oct. 18-20, 2017, pp. 48-53.

Marcal et al., "A Grouping Strategy for Parallel Group Detection in Synchronous Gaussian CDMA Channels", International Telecommunications Symposium, Sep. 3-6, 2006, pp. 426-431.

Peng et al., "Heterogeneous Cloud Radio Access Networks: A New Perspective for Enhancing Spectral and Energy Efficiencies", IEEE Wireless Communications, vol. 21, No. 6, Dec. 2014, pp. 126-135.

Bavarian et al., "Reduced Complexity Distributed Base Station Processing in the Uplink of Cellular Networks", IEEE Globecom 2007—IEEE Global Telecommunications Conference, Nov. 26-30, 2007, pp. 4500-4504.

Moon et al., "Enhanced Groupwise Detection with a New Receive Combiner for Spatial Multiplexing MIMO Systems", IEEE Transactions on Communications, vol. 58, No. 9, Sep. 2010, pp. 2511-2515.

International Search Report and Written Opinion received for corresponding Patent Cooperation Treaty Application No. PCT/EP2019/078509, dated Mar. 24, 2020, 20 pages.

T. Calinski and J. Harabasz. "A dendrite method for cluster analysis," Communications in Statistics, 1974.

* cited by examiner

PROCESSING OF UPLINK DATA STREAMS

RELATED APPLICATION

This application was originally filed as PCT Application No. PCT/EP2019/078509, filed on Oct. 21, 2019, which claims priority from Indian Application No. 201841041969, filed on Nov. 6, 2018, each of which is incorporated herein by reference in its entirety.

FIELD

Example embodiments relate to the processing of uplink data streams, for example at a Multiple Input Multiple Output (MIMO) receiver, massive MIMO receiver or associated radio access network (RAN).

BACKGROUND

With cellular networks becoming denser and with the use of Massive MIMO receivers, wireless resource reuse increases significantly, resulting in the need to mitigate and handle inter-user interference efficiently. In the uplink, receiver techniques, such as, for example, Maximum Likelihood Detection (MLD), lattice reduction, interference cancellation etc., can achieve much better performance by combating interference.

Each successive generation of cellular networks are designed to provide even higher throughput, seamless connectivity and meet the Quality of Service needs of applications that require high throughput and/or low latency. To enhance spectral efficiency, simultaneous communications with multiple users, each having multiple spatial streams or layers, may be supported. Consequently, efficient and robust multi-user MIMO signal detection algorithms for the uplink have been proposed.

SUMMARY

In accordance with one aspect, there is provided an apparatus, comprising: means for identifying a plurality of user equipment (UE), each transmitting one or more uplink data streams for decoding at a base station associated with a given cell of a radio network; means for clustering the identified user equipment into joint processing groups, each joint processing group comprising the identities of two or more user equipment as clustered; means for performing, in a first processing stage, joint processing of the uplink data streams for identified user equipment within common joint processing groups using one or more first processing algorithms to produce corresponding first processed uplink data streams; and means for performing one or more subsequent processing stages on the first processed uplink data streams, subsequent to the joint processing, to produce decoded uplink data streams, the one or more subsequent processing stages using one or more second processing algorithms, different from the first processing algorithm.

The one or more second processing algorithms for the one or more subsequent processing stages may be computationally less intensive than the first processing algorithm or that of a prior processing stage.

The one or more first processing algorithms may comprise one or more interference mitigation algorithms for mitigating interference among the uplink data streams for user equipment within a common joint processing group.

The one or more first interference mitigation algorithms may comprise one or more of maximum likelihood and sphere decoding algorithms.

The one or more second processing algorithms may comprise linear interference cancellation algorithms, e.g. one or more of maximal ratio combining (MRC), zero forcing (ZF), minimum mean square error (MMSE).

The clustering means may be configured to allocate each user equipment to one or more groups and iteratively to perform further clustering and/or de-clustering of the one or more groups using a clustering algorithm until a predetermined stopping criterion is identified to provide a number of groups $N_g$ representing the joint processing groups.

For each iteration, a grouping quality (GQ) may be determined and the stopping criterion may be identified based on the grouping quality being above a predetermined value or a maximum value, the groups at the iteration corresponding to said predetermined or maximum value providing the joint processing groups.

The grouping quality (GQ) may be based at least partly on metrics representing intra-group distances and inter-group distances that use the uplink channel distances for different pairwise combinations of user equipment.

The grouping quality (GQ) may be based on the ratio of inter-group distances to intra-group distances.

The grouping quality (GQ) may be determined by:

$$GQ(K) = \frac{V_{inter}(K)/(K-1)}{V_{intra}(K)/(N-K)}$$

where $V_{inter}$ is a measure of variation of the user's channels between user groups, $V_{intra}$ is a measure of the variation of the users' channels within groups, N is the number of user equipment and K is the number of groups.

One or more of the user equipment (UE) may comprise one or more antenna elements ($N_t$) and the base station comprises a plurality of antenna elements ($N_r$), and wherein the apparatus may further comprise means providing, for each user equipment, a channel matrix (H) representing independent uplink data streams between the one or more user equipment elements and the base station elements, wherein the grouping quality (GQ) is based at least partly on metrics representing intra-group distances and inter-group distances between channel matrices for different pairwise combinations of user equipment.

The clustering means may be configured to determine for each pairwise combination in a group, a channel distance d(n, m), and to determine therefrom the inter-group distances and intra-group distances.

The clustering means may be configured to determine each channel distance d(n, m) using:

$$d(n, m) = \|H_n - H_m\|_S = \frac{1}{n_t}\sqrt{\sum_{k=1}^{n_t}(1 - \sigma_k^2(Q_n^H Q_m))}$$

where $H_n$ and $H_m$ are uplink channel matrices representing the channels of first and second user equipment, $Q_m$ and $Q_n$ are the orthogonal bases for $H_n$ and $H_m$, and $\sigma_k$ is the $k^{th}$ smallest singular value of the matrix.

The clustering means may be configured to determine the inter-group distance based on one of an average dissimilarity, a minimum dissimilarity or a maximum dissimilarity.

The clustering means may be configured to determine the intra-group distance, for a given group Gi, using:

$$D(\mathcal{G}_l) = \sum_{i \in \mathcal{G}_l} \left[ \sum_{j \in \mathcal{G}_l} d(i, j) \right]$$

The clustering means may be further configured to determine, from the inter-group and intra-group distances, inter-group variation $V_{inter}$ and intra-group variation $V_{intra}$, and wherein the grouping quality (GQ) is determined based on the ratio of inter-group variation to intra-group variation.

The grouping quality (GQ) may be determined using:

$$GQ(K) = \frac{V_{inter}(K)/(K-1)}{V_{intra}(K)/(N-K)}$$

where N is the number of user equipment and K is the number of groups.

The stopping criterion may be determined using:

$$N_g = \arg\max_K GQ(K)$$

The apparatus may further comprise means for grouping the joint processing groups into one or more inter-groups for the one or more subsequent processing stages, each inter-group comprising user equipment identified in two or more joint processing groups based on one or more channel characteristics between the joint decoding groups, and wherein the means for performing one or more subsequent processing stages performs the one or more second processing algorithms on the processed uplink signals from the previous stage within common inter-groups.

The one or more second processing algorithms may be performed in a predetermined order.

The clustering means may be configured to duster the identified user equipment per transmission time interval (TTI) of the cell.

The clustering means may be configured to cluster the identified user equipment at each arrival and departure event of user equipment in relation to the cell.

The clustering means may be configured to cluster the identified user equipment based on predicting which user equipment in the cell will transmit an uplink signal in a given transmission time interval (TTI) of the cell.

The identifying means may be configured to identify user equipment in a cell at a given future time based on statistical analysis for predicting which user equipment are in the cell at said given time.

The apparatus may further comprise: means for determining a channel quality of the one or more decoded uplink data streams for a given set of joint clustering groups; and means providing a learning model for determining future sets of joint clustering groups based on input data, wherein the learning model is trained using feedback data representing the channel quality that results for the given set of joint clustering groups.

The apparatus may be provided in a base station of a radio access network.

The apparatus may be provided in a cloud radio access network.

According to a second aspect, there is provided a method, comprising: identifying a plurality of user equipment (UE), each transmitting one or more uplink data streams for decoding at a base station associated with a given cell of a radio network; clustering the identified user equipment into joint processing groups, each joint processing group comprising the identities of two or more user equipment as clustered; performing, in a first processing stage, joint processing of the uplink data streams for identified user equipment within common joint processing groups using one or more first processing algorithms to produce corresponding first processed uplink data streams; and performing one or more subsequent processing stages on the first processed uplink data streams, subsequent to the joint processing, to produce decoded uplink data streams, the one or more subsequent processing stages using one or more second processing algorithms, different from the first processing algorithm.

The one or more second processing algorithms for the one or more subsequent processing stages may be computationally less intensive than the first processing algorithm or that of a prior processing stage.

The one or more first processing algorithms may comprise one or more interference mitigation algorithms for mitigating interference among the uplink data streams for user equipment within a common joint processing group.

The one or more first interference mitigation algorithms may comprise one or more of maximum likelihood and sphere decoding algorithms.

The one or more second processing algorithms may comprise linear interference cancellation algorithms, e.g. one or more of maximal ratio combining (MRC), zero forcing (ZF), minimum mean square error (MMSE).

The clustering means may be configured to allocate each user equipment to one or more groups and iteratively to perform further clustering and/or de-clustering of the one or more groups using a clustering algorithm until a predetermined stopping criterion is identified to provide a number of groups $N_g$ representing the joint processing groups.

For each iteration, a grouping quality (GQ) may be determined and the stopping criterion is identified based on the grouping quality being above a predetermined value or a maximum value, the groups at the iteration corresponding to said predetermined or maximum value providing the joint processing groups.

The grouping quality (GQ) may be based at least partly on metrics representing intra-group distances and inter-group distances that use the uplink channel distances for different pairwise combinations of user equipment.

The grouping quality (GQ) may be based on the ratio of inter-group distances to intra-group distances.

The grouping quality (GQ) may be determined by:

$$GQ(K) = \frac{V_{inter}(K)/(K-1)}{V_{intra}(K)/(N-K)}$$

where $V_{inter}$ is a measure of variation of the user's channels between user groups, $V_{intra}$ is a measure of the variation of the users' channels within groups, N is the number of user equipment and K is the number of groups.

One or more of the user equipment (UE) may comprise one or more antenna elements ($N_t$) and the base station comprises a plurality of antenna elements ($N_r$), and wherein the method may further comprise providing, for each user equipment, a channel matrix (H) representing independent uplink data streams between the one or more user equipment elements and the base station elements, wherein the grouping quality (GQ) is based at least partly on metrics representing intra-group distances and inter-group distances between channel matrices for different pairwise combinations of user equipment.

The clustering may determine for each pairwise combination in a group, a channel distance d(n, m), and determines therefrom the inter-group distances and intra-group distances.

The clustering may determine each channel distance d(n, m) using:

$$d(n, m) = \|H_n - H_m\|_S = \frac{1}{n_t}\sqrt{\sum_{k=1}^{n_t}(1 - \sigma_k^2(Q_n^H Q_m))}$$

where $H_n$ and $H_m$ are uplink channel matrices representing the channels of first and second user equipment, $Q_m$ and $Q_n$ are the orthogonal bases for $H_n$ and $H_m$, and $\sigma_k$ is the $k^{th}$ smallest singular value of the matrix.

The clustering may determine the inter-group distance based on one of an average dissimilarity, a minimum dissimilarity or a maximum dissimilarity.

The clustering means may be configured to determine the intra-group distance, for a given group Gi, using:

$$D(\mathcal{G}_l) = \sum_{i \in \mathcal{G}_l}\left[\sum_{j \in \mathcal{G}_l} d(i, j)\right]$$

The clustering means may be further configured to determine, from the inter-group and intra-group distances, inter-group variation $V_{inter}$ and intra-group variation $V_{intra}$, and wherein the grouping quality (GQ) is determined based on the ratio of inter-group variation to intra-group variation.

The grouping quality (GQ) may be determined using:

$$GQ(K) = \frac{V_{inter}(K)/(K-1)}{V_{intra}(K)/(N-K)}$$

where N is the number of user equipment and K is the number of groups.

The stopping criterion may be determined using:

$$N_g = \arg\max_K GQ(K)$$

The method may further comprise grouping the joint processing groups into one or more inter-groups for the one or more subsequent processing stages, each inter-group comprising user equipment identified in two or more joint processing groups based on one or more channel characteristics between the joint decoding groups, and wherein performing one or more subsequent processing stages performs the one or more second processing algorithms on the processed uplink signals from the previous stage within common inter-groups.

The one or more second processing algorithms may be performed in a predetermined order.

The clustering may cluster the identified user equipment per transmission time interval (TTI) of the cell.

The clustering may cluster the identified user equipment at each arrival and departure event of user equipment in relation to the cell.

The clustering may cluster the identified user equipment based on predicting which user equipment in the cell will transmit an uplink signal in a given transmission time interval (TTI) of the cell.

The identifying may identify user equipment in a cell at a given future time based on statistical analysis for predicting which user equipment are in the cell at said given time.

The method may further comprise: determining a channel quality of the one or more decoded uplink data streams for a given set of joint clustering groups; and providing a learning model for determining future sets of joint clustering groups based on input data, wherein the learning model is trained using feedback data representing the channel quality that results for the given set of joint clustering groups.

The method may be performed in a base station of a radio access network.

The method may be performed in a cloud radio access network.

According to another aspect, there is provided an apparatus, comprising at least one processor, at least one memory directly connected to the at least one processor, the at least one memory including computer program code, and the at least one processor, with the at least one memory and the computer program code being arranged to perform the method of any of preceding definition.

According to another aspect, there is provided a computer program product comprising a set of instructions which, when executed on an apparatus, is configured to cause the apparatus to carry out the method of any preceding definition.

According to another aspect, there is provided a non-transitory computer readable medium comprising program instructions stored thereon for performing a method, comprising: identifying a plurality of user equipment (UE), each transmitting one or more uplink data streams for decoding at a base station associated with a given cell of a radio network; clustering the identified user equipment into joint processing groups, each joint processing group comprising the identities of two or more user equipment as clustered; performing, in a first processing stage, joint processing of the uplink data streams for identified user equipment within common joint processing groups using one or more first processing algorithms to produce corresponding first processed uplink data streams; and performing one or more subsequent processing stages on the first processed uplink data streams, subsequent to the joint processing, to produce decoded uplink data streams, the one or more subsequent processing stages using one or more second processing algorithms, different from the first processing algorithm.

According to another aspect, there is provided an apparatus comprising: at least one processor; and at least one memory including computer program code which, when executed by the at least one processor, causes the apparatus: to identify a plurality of user equipment (UE), each transmitting one or more uplink data streams for decoding at a base station associated with a given cell of a radio network; to cluster the identified user equipment into joint processing groups, each joint processing group comprising the identities of two or more user equipment as clustered; to perform, in a first processing stage, joint processing of the uplink data streams for identified user equipment within common joint processing groups using one or more first processing algorithms to produce corresponding first processed uplink data streams; and to perform one or more subsequent processing stages on the first processed uplink data streams, subsequent to the joint processing, to produce decoded uplink data streams, the one or more subsequent processing stages using one or more second processing algorithms, different from the first processing algorithm.

BRIEF DESCRIPTION OF DRAWINGS

Example embodiments will now be described, by way of non-limiting example, with reference to the accompanying drawings, in which.

DETAILED DESCRIPTION

Example embodiments relate to radio networks, for example cellular radio networks which may comprise MIMO or massive MIMO receivers, although the term MIMO may be used throughout for simplicity. Example embodiments provide efficient and robust multi-user MIMO signal detection algorithms, primarily for uplink data streams between user equipment and MIMO base stations, e.g. eNodeBs, gNodeBs etc.

Example embodiments also cover the case where user equipment (UE) may comprise an antenna with multiple antenna elements. In such cases, there may be, between a UE and a base station, multiple independent data streams for reception at multiple antenna elements of a base station associated with a cell. Such data streams may be represented in a matrix (H) based on the number of antenna elements at the UE and the number of antenna elements at the MIMO base station.

Signal detection algorithms may exhibit a trade-off between performance and computational complexity. The simpler MIMO detection algorithms may be mostly linear in nature (using, for example, Maximal Ratio Combining (MRC), Zero Forcing (ZF), Minimum Mean Square Error (MMSE), etc.) and may provide sub-optimal performance, whereas the optimal detection algorithm may be a Maximum Likelihood (ML or MLD) technique that employs joint decoding but is significantly more complex. Even low-complexity approximations of ML detection algorithms, such as Sphere Decoders are substantially more complex than the traditional linear detectors. Additionally, the complexity of ML grows exponentially with the number of users. In particular, the complexity of ML grows as $M^L$, where M is the constellation size, and L is the number of layers summed across co-scheduled UEs.

In example embodiments, at a base station, it is critical that the right set of users be selected for joint decoding, which is the first level of interference-reduction processing. In addition, these groups may be grouped further for appropriate inter-group interference reduction processing, which forms a second level of interference management.

Example embodiments are applicable also to a cloud-RAN deployment, in which the grouping concept can be further extended to form inter-site groups. Embodiments therefore propose novel algorithms for user grouping, as well as a receiver architecture to take advantage of this.

Example embodiments focus on advanced reception of uplink transmissions at the base station in a massive MIMO cellular network (such as a 5G network) and proposes efficient user grouping algorithms as well as a hierarchical base station receiver architecture to enable optimal multi-user MIMO detection at the base station while reducing or minimizing complexity. Example embodiments focus on how to employ advanced receiver processing for as many users as possible in a base station without making the receiver too complex to implement in a cost-effective manner. The interference environment in 5G is expected to be severe given the increased user and cell density. The use of advanced receivers at the base station that can handle interference becomes critical.

Using complex algorithms, such as joint ML, for the detection of all the layers for all users in a given cell is just too complex to implement in a cost-effective fashion. However, there is a need in 5G for a method that can leverage the large link level gains (several dBs) of joint receiver processing without increasing the processing complexity to the point that the processing cannot be implemented. Performing joint receiver processing for a large number of UEs is computationally prohibitive given that large matrices need to be processed. However, it would be feasible to do joint receiver processing for a small subset of layers/users, but in an iterative fashion such that all UEs are covered. Example embodiments may involve iterative processing and address the question of which set of UEs should be jointly received and in what sequence. For example, UEs with large correlation among their channel matrices may be jointly received, and those with very small correlation in their channel matrices may be independently received or decoded using less complex algorithms.

Figure 1:
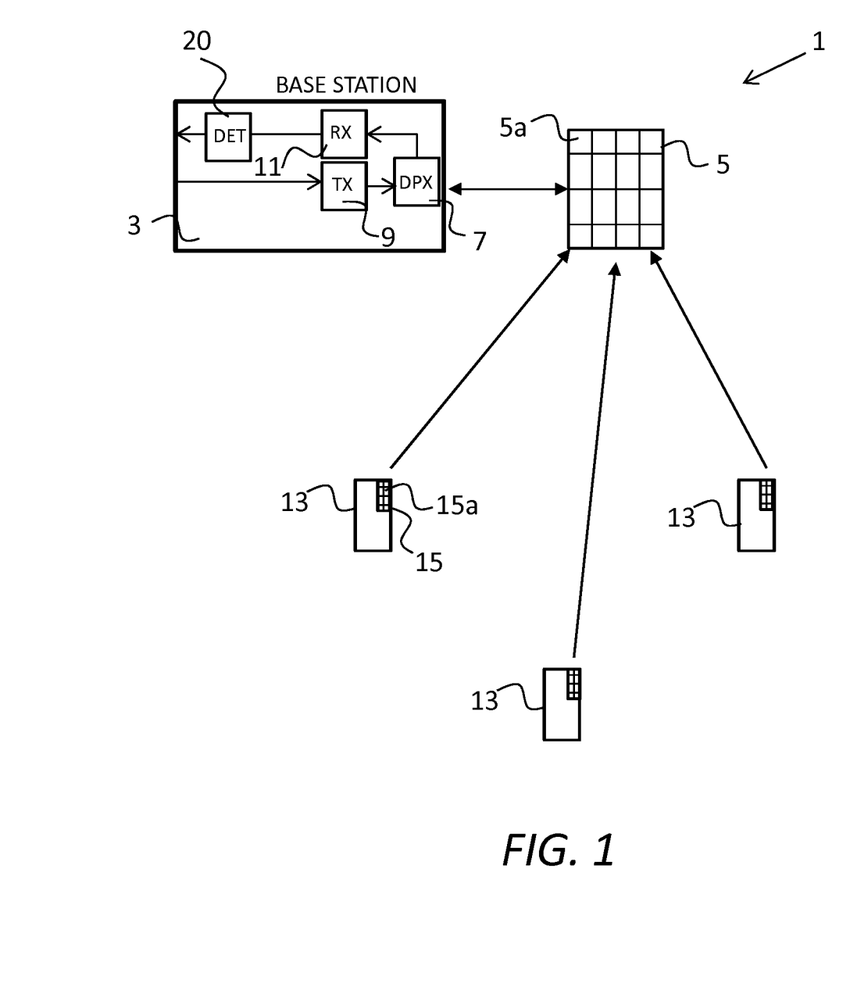
FIG. 1 is a schematic diagram of part of a MIMO radio network infrastructure, according to some example embodiments.

FIG. 1 is a schematic diagram of part of a MIMO radio network infrastructure 1, comprising a base station 3 and an associated antenna array 5 comprising a plurality of antenna elements 5a. The antenna array 5 may typically be mounted on a mast or tall building and may be at approximately the same geographic location as the base station 3. The base station 3 may comprise a duplexer 7, a transmitter 9 and a receiver 11. Associated with the receiver 11 may be provided a detection and processing module 20 according to example embodiments. Example embodiments herein concern the receiver 11 which is configured to provide MIMO signal detection and processing, e.g. to decode and mitigate or remove interference.

A plurality of UEs 13 are shown within signalling range of the base station 3 and antenna array 5, i.e. within a cell served by the base station 3. At any point in time, any number of UEs 13 may be within the cell and this number will vary over time. At least one UE 13 may comprise an antenna 15 having multiple antenna elements 15a.

The UEs 13 may be of any suitable type. For example, they may comprise any portable or non-portable terminal capable of radio frequency communications with the base station 3 via the antenna array 5. For example the UEs 13 may comprise mobile telephones, smartphones, tablet computers, laptops, personal computers (PCs), digital assistants, internet of things (IoT) devices, smartwatches, etc.

Figure 2:
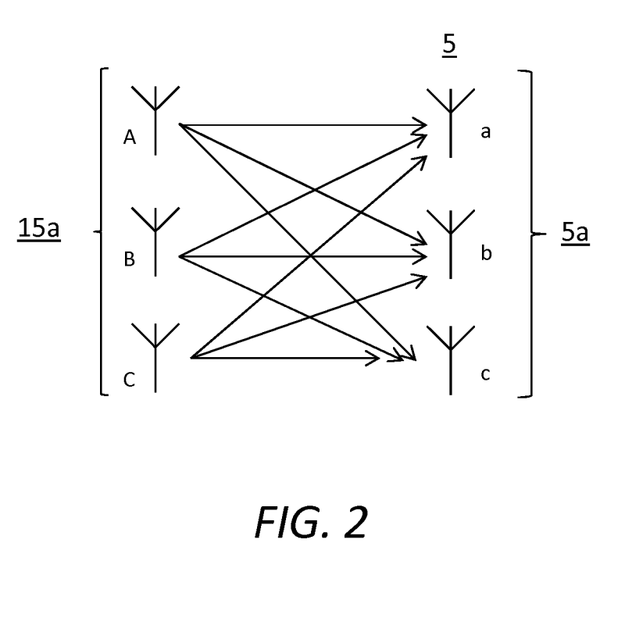
FIG. 2 is a schematic diagram of a MIMO uplink channel matrix.

FIG. 2 is a schematic diagram of a MIMO uplink channel matrix, representing the various uplink channel responses between each antenna element 15a of a given UE 13 and each antenna element 5a of the antenna array 5. For ease of illustration and explanation, only three antenna elements 5a, 15a are indicated at each end. It will be seen that a 3×3 matrix (H) can be provided, representative of all possible combinations of uplink data streams representing a common data transmission between a UE 13 and the antenna array 5. The matrix H may appear as:

$$H_m = \begin{bmatrix} h_{a,A} & h_{a,B} & h_{a,C} \\ h_{b,A} & h_{b,B} & h_{b,C} \\ h_{c,A} & h_{c,B} & h_{c,C} \end{bmatrix}$$

where m is the index of the UE 13, and h is the channel impulse response of the corresponding pairs of receive and transmit antennas of the uplink channel. For example, h may be a complex number representing the effect of the wireless propagation channel on a signal transmitted from a particular transmitter antenna to a particular receiver antenna.

In accordance with an example embodiment, functionality is provided at the base station receiver 11, or associated with the base station receiver, for improving the receiver's performance in terms of BLER and/or multiplexing gain, whilst also reducing or minimising complexity. Embodiments may also be implemented without departing from the scope at a RAN for remotely controlling one or more base stations in a similar manner.

Example embodiments may achieve an improved performance versus complexity trade-off by employing a receiver architecture that makes use of multiple advanced receiver algorithms with different complexities in a hierarchical architecture. The receiver algorithms are chosen based on the desired Quality of Service (QoS), interference environment, interference load, etc.

Figure 3:
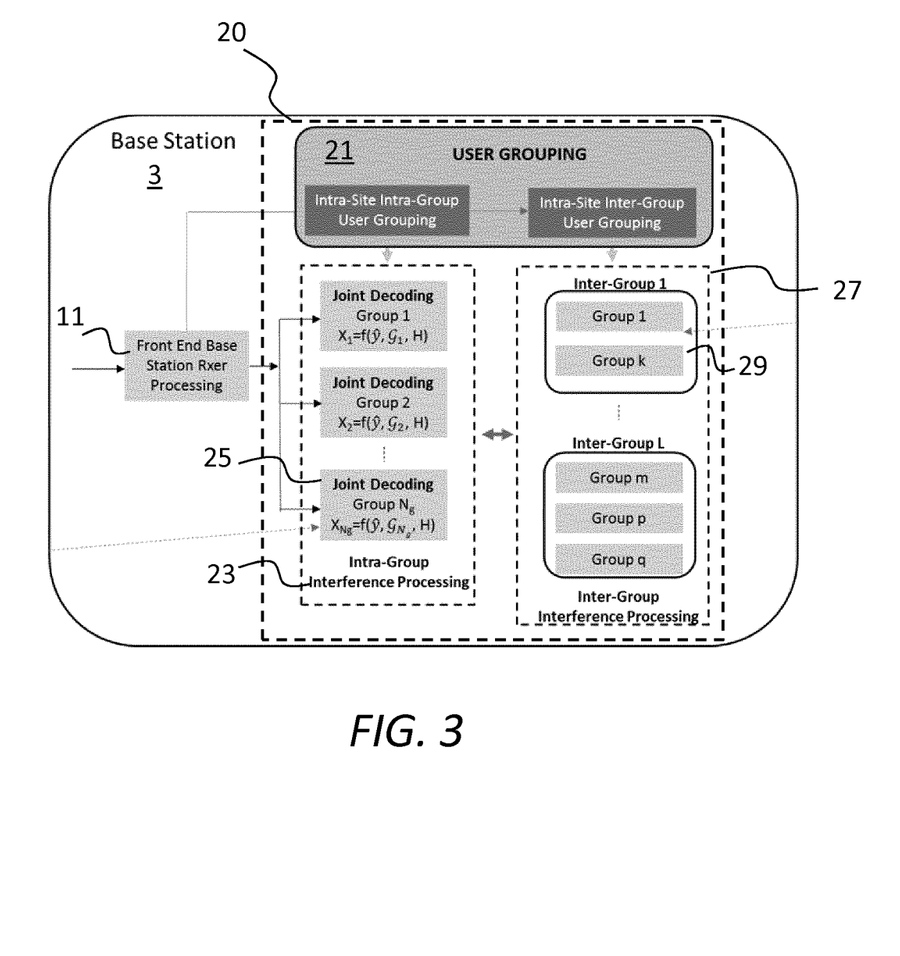
FIG. 3 is an example architecture for a standalone base station according to some example embodiments.

An example architecture in shown in FIG. 3 for a stand-alone base station 3. Here, a two-level interference processing hierarchy is used to reduce complexity while still reaping the bulk of the performance gains. The base station 3 comprises the receiver 11, here labelled as a front end base station receiver processer 11, which provides data on the received signals to the detection and processing module 20. The detection and processing circuit 20 includes a user grouping module 21. The user grouping module 21 is configured to identify UEs for which respective uplink channels are to be grouped in the two-level interference processing. It will be appreciated that more than two levels may be provided in such a hierarchical processing system, in other embodiments. The user grouping module 21 performs two types of grouping, namely intra-site or intra-group user grouping and inter-site or inter-group user grouping. Intra-group user grouping is concerned with clustering UEs into one or more joint processing groups, collectively indicated by reference numeral 23, whereby the uplink data streams for each are jointly processed, e.g. decoded to remove some or most interference, substantially simultaneously to produce from each intra-group 25 a jointly-processed uplink data streams. Inter-group user grouping is concerned with grouping selected intra-groups 25 in a particular way to enable one or more further levels of decoding on the jointly-processed signals, in a more efficient and less complex way.

The user grouping module 20 is configured to perform a clustering algorithm to define the joint processing (intra) groups 23 and one or more inter groups 29, collectively shown by reference numeral 27 where two or more inter groups are determined by the clustering algorithm.

The number of UEs in a joint-processing group 25 may or may not be fixed. The number may be adaptively modified each clustering iteration, e.g. to be optimised, or to conform to a fixed number. There may be a varying or fixed number of joint-processing groups 25. In some embodiments, UEs may be clustered to one joint-processing group 25 only, and in other embodiments, UEs may be assigned to more than one joint-processing group. Similarly, there may be a varying number of inter-groups 29 and there may be a varying number of joint-processing groups 25 within different iterations of the inter-grouping.

Figure 4:
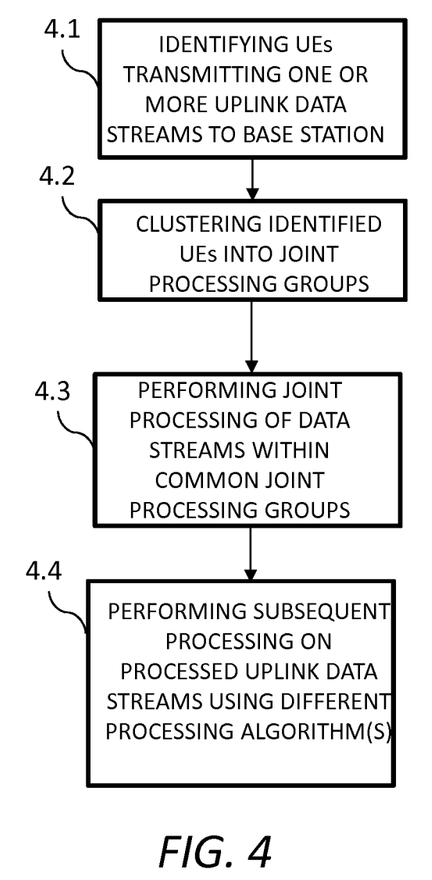
FIG. 4 is a flow diagram showing example processing operations that may be performed by a base station in accordance with example embodiments.

An overview of example embodiments will now be described. FIG. 4 is a flow diagram showing example processing operations that may be performed by the base station 3 in accordance with example embodiments, whether by means of hardware, software or a combination thereof. Additional or less operations may be performed in some embodiments.

A first operation 4.1 may comprise identifying a plurality of user equipment (UE), each transmitting one or more uplink data streams for decoding at a base station associated with a given cell of a radio network.

Another operation 4.2 may comprise clustering the identified user equipment into joint processing groups, each joint processing group comprising the identities of two or more user equipment as clustered.

Another operation 4.3 may comprise performing, in a first processing stage, joint processing of the uplink data streams for identified user equipment within common joint processing groups using one or more first processing algorithms to produce corresponding first processed uplink received signals or bits or soft-bits.

Another operation 4.4 may comprise performing one or more subsequent processing stages on the first processed uplink received signals, subsequent to the joint processing, to produce decoded uplink bits or soft-bits or packets, the one or more subsequent processing stages using one or more second processing algorithms, different from the first processing algorithm.

Typically, the second processing algorithm may be less computationally intensive than the first processing algorithm. For example, the one or more first processing algorithms may comprise one or more interference mitigation algorithms for mitigating interference among the uplink data streams for user equipment within a common joint processing group, e.g. using one or more of maximum likelihood and sphere decoding algorithms. The one or more second processing algorithms may comprise linear interference cancellation algorithms, e.g. one or more of maximal ratio combining (MRC), zero forcing (ZF), minimum mean square error (MMSE).

In some embodiments, users that heavily interfere with each other are first grouped by the user grouping module 21, using clustering, into multiple joint-decoding groups 25 and may be jointly decoded within each group. Complex, non-linear receiver algorithms such as sphere decoding can be used for detection within these joint-decoding groups 25 to handle larger inter-user interference and remove as much intra-group interference as possible. The next step/level in the hierarchy, i.e. in the inter-groups 29, may use lower complexity algorithms such as interference cancellation to cancel inter-group interference between specifically chosen intra-groups 25.

Figure 5:
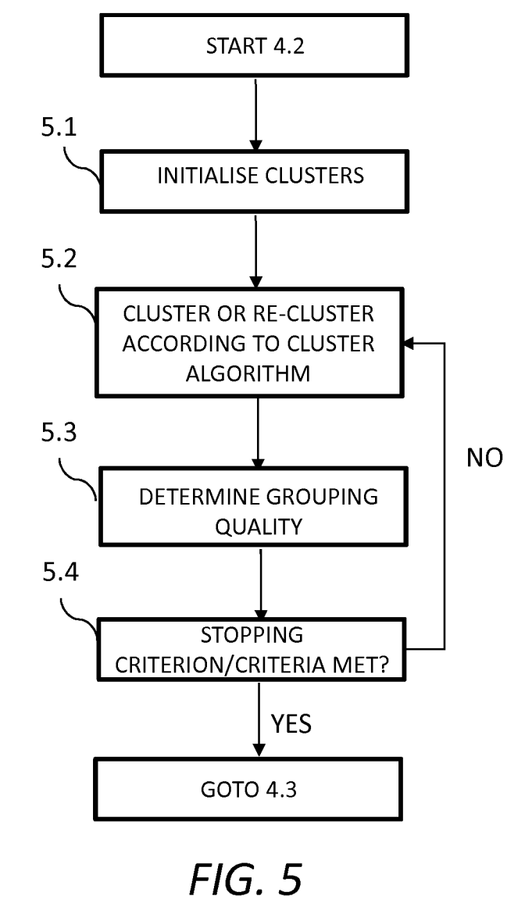
FIG. 5 is a flow diagram showing further processing operations that may be performed by the base station in accordance with other example embodiments.

FIG. 5 is a flow diagram showing example processing operations that may be performed at the detection and processing module 20 in accordance with example embodiments, whether by means of hardware, software or a combination thereof. Additional or less operations may be performed in some embodiments. The operations relate to example operations that may be performed as part of operation 4.2 above, i.e. clustering.

A first operation 5.1 may comprise initialising a set of clusters.

A second operation 5.2 may comprise clustering or re-clustering (iterations) according to clustering algorithm.

A third operation 5.3 may comprise determining a grouping quality (GC) using some metric.

A fourth operation 5.4 may comprise using the determined GC to determine if a stopping criterion (or criteria if more than one is set) is met. If not, then operation 5.2 is returned to, and the process repeated until the stopping criterion is met. If it is met, the operation returns to operation 4.3 for performing the different levels of processing, e.g. decoding, interference removal etc.

In overview, the clustering algorithm iteratively produces different combinations of intra and inter-groups and tests the grouping quality until a predetermined criterion or criteria is or are met. As a further enhancement, one possibility is also to obtain the statistical information from the previous channel states and the previous runs of the clustering algorithms, and then to employ machine learning techniques to exploit this information. This approach is helpful in enhancing the performance or in reducing the computational complexity of the clustering algorithms.

Figure 6:
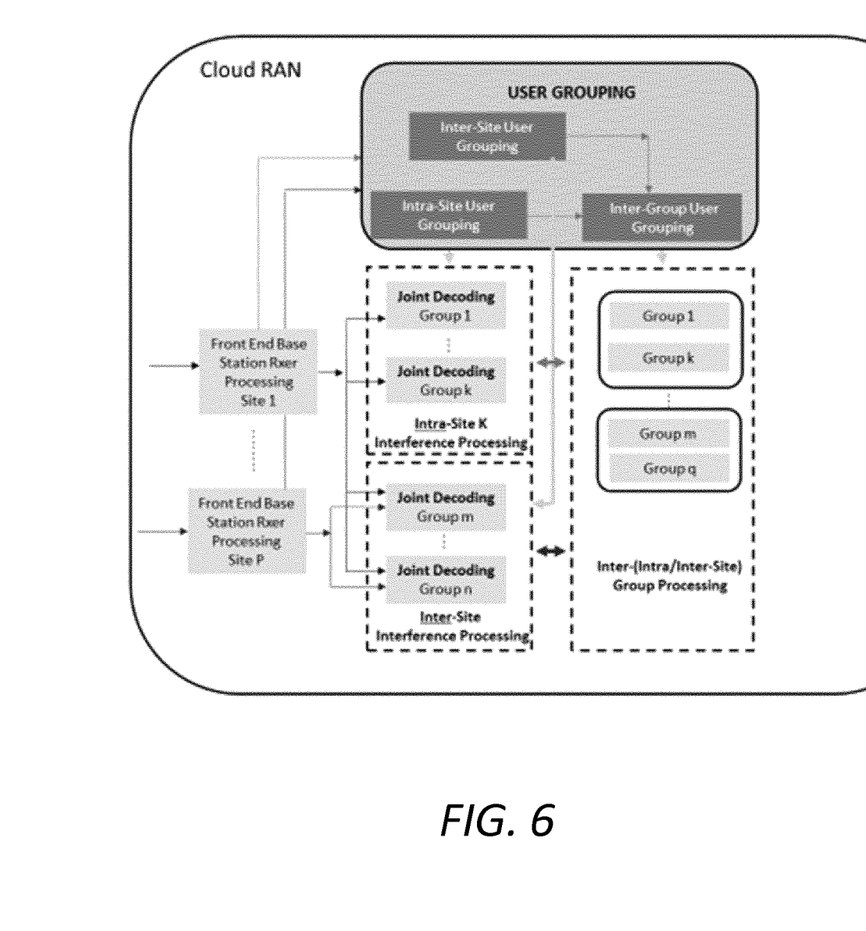
FIG. 6 is an example architecture for a radio access network according to some example embodiments.

A further example architecture is shown in FIG. 6, for a Cloud RAN where we extend the above FIG. 3 concept to handle inter-site processing of UEs. This approach further optimizes the performance versus complexity trade-off by making the complexity dependent upon the interference environment/load, and by focusing the use of complex algorithms at the most appropriate place. The FIG. 6 architecture provides a way of grouping users or UEs across different geographical sites. Intra-site refers to grouping users or UE within a single base station for joint processing. Inter-group processing is for users that are spread across different base stations at different geographical locations. Intra-site processing is generally easier because all required data and information is available locally within the base station. Inter-site processing may require data to be transported from geographically different base stations to another base station.

A feature of the proposed methods described herein is the grouping, or clustering, of UEs into appropriate groups. It will be appreciated that this refers to grouping of UEs identities and/or uplink signals for subsequent processing, e.g. decoding, rather than UEs themselves. Example embodiments identify, and separate UEs based on the level or degree of interference they cause to each other. Machine learning-based techniques may be used to provide, learn and iteratively update a learned model for the grouping criteria and clustering algorithms for appropriate and optimal user grouping.

Components of example embodiments may involve the grouping of UEs, the decoding of the uplink data streams of the selected UEs within a user group jointly, followed by further sequential decoding across different UE groups.

Example embodiments may involve the following high-level operations, namely grouping of UEs (clustering can be based on the "geometric distance" between their uplink channels, as an example), joint decoding of the UEs within the same joint-processing group 25, and an application of interference cancellation techniques for decoding UEs across the groups, i.e. inter-group decoding.

In one embodiment, we form a mutually exclusive grouping of UEs. However, in a further embodiment, we can have one or more UEs appear in multiple groups to allow joint decoding of several combinations of UEs. This may be useful when the number of UEs in a joint-processing group 25 needs to be small, to allow for lower computational complexity, when it would be possible to implement a joint receiver for a larger number of groups due to, for example, the availability of many processor cores that can simultaneously handle the joint receiver processing of individual groups. The criteria for which UEs should be in multiple joint-processing groups 25 could be determined not just based on the UEs' channel correlations, but also on other criteria, such as QoS requirements, scheduler metrics, etc. For example, Ultra-Reliable Low-Latency Communications (URLLC) UEs, cell-edge UEs, UEs with larger scheduler metrics, etc. may be in a larger number of groups to increase the chance of successful decoding of these UEs' transmissions.

There are multiple timescales at which the user grouping module 21 may perform clustering or grouping operations or iterations.

For example, grouping can happen on a per-Transmission Time Interval (TTI) basis, based on the scheduled users in that TTI. In another approach, user grouping can happen based on the timescale of UE arrivals and departures, where the clusters are determined based on the active UEs in the cell. Subsequently, based on the UEs scheduled in a given TTI, the UE grouping that is already determined during the arrival/departure events may be used. In yet another approach, grouping can happen on a long-term basis, where user cluster boundaries are determined based on the long-term statistics of UEs in the cell. Then, on a per-TTI basis, based on the scheduled UEs, an inference engine can be run to determine which UEs are part of which groups. The first option, i.e. per TTI, has better performance than grouping done at the timescale of user arrivals and departures, which in turn will have better performance than the option of grouping based on long-term statistics. However, from a computation perspective, the first option has the highest computational complexity because the grouping is happening on a per-TTI basis. The second option has the next highest computational complexity, and the last option has the least computational complexity, given that only an inference engine needs to be run, e.g. by a neural network, that has already been trained to determine the optimal clustering.

Example embodiments can be used for joint decoding of not just UEs scheduled in a given cell in a MIMO or massive MIMO fashion, but also for performing joint reception of UEs scheduled in one or more other cells in either the same cell site (intra-site) or even across different cell sites (inter-site).

UE Grouping

We first describe UE grouping for the case where grouping is mutually exclusive, i.e., each UE appears in one and only one joint-processing group 25. We will later extend this to the case where a UE can appear in multiple groups.

UE grouping may be performed by exploiting the UE to base station channel structure. The grouping can be based on various criterion such as "channel similarity" or fairness criteria.

Let $\{UE_1, UE_2, \ldots, UE_N\}$ be the UEs present in the given cell and scheduled in a given TTI.

Let: N—be the number of UEs scheduled for transmission;
$N_r$—be the number of antennas at the base station;
$N_t$—be the number of antennas at the UEs;
$H_n$—be the $N_r \times N_t$ channel matrix representing the channel between the UEn and the base station.

Without loss of generality, we may assume that each UE transmits $N_t$ number of independent data streams. Further, it is assumed that $N_r > N \cdot N_t$.

User Grouping without Overlap

In this example, we may employ clustering techniques from machine learning to group UEs based on their channel similarity. The groups formed may be disjoint. Given the UE set $\{UE_1, UE_2, \ldots, UE_N\}$ and the corresponding channel matrices, $\{H_1, H_2, \ldots, H_N\}$, we may define the following terms:

Channel Distance (CD)

Channel distance $d_{n,m}$ between two users $UE_n$ and $UE_m$ is a measure of "channel similarity" between their uplink channels, $H_n$ and $H_m$. For example, the matrix may represent the channel attenuation between the transmitter and receiver antennas. H may be measured at the receiver base station with the help of uplink training symbols or pilot signals. For example, the channel similarity between UE1 and UE2 may be measured based on the similarity of the corresponding channel matrices H1 and H2, with the pairwise values in the matrix representing the uplink channels of the corresponding pair of users. This measure can be defined as the subspace distance (see equation (1) below) between the matrices $H_n$ and $H_m$.

$$d(n, m) = \|H_n - H_m\|_S = \frac{1}{n_t} \sqrt{\sum_{k=1}^{n_t} \left(1 - \sigma_k^2(Q_n^H Q_m)\right)} \quad (1)$$

where $Q_m$ and $Q_n$ are the orthogonal bases for $H_m$ and $H_n$, e.g. $H_n = Q_n R_n$, and $H_m = Q_m R_m$ by QR decomposition, and the $\sigma_k(A)$ is the $k^{th}$ smallest singular value of the matrix A (i.e., $\sigma_{n_t} \geq \sigma_{n_{t-1}} \geq \ldots \geq \sigma_1$). Other definitions of the channel distance are possible.

Intergroup Dissimilarity

There are multiple possible definitions of this metric, although three are mentioned here.

A. Average dissimilarity:

For any two groups $g_l$ and $g_k$, the average distance $D_{Gave}(g_l, g_k)$ between them is given by:

$$D_{Gave}(\mathcal{G}_l, \mathcal{G}_k) = \frac{1}{|\mathcal{G}_l||\mathcal{G}_k|} \sum_{i_l \in \mathcal{G}_l} \left[ \sum_{j_k \in \mathcal{G}_k} d(i_l, j_k) \right] \quad (2)$$

B. Minimum dissimilarity: for any two groups $\mathcal{G}_l$ and $\mathcal{G}_k$, the distance $D_{Gmin}(\mathcal{G}_l, \mathcal{G}_k)$ between the closest pair is given by:

$$D_{Gmin}(\mathcal{G}_l, \mathcal{G}_k) = \min_{\substack{i_l \in \mathcal{G}_l \\ j_k \in \mathcal{G}_k}} d(i_l, j_k) \quad (3)$$

C. Maximum dissimilarity: for any two groups $\mathcal{G}_l$ and $\mathcal{G}_k$, the distance $D_{Gmax}(\mathcal{G}_l, \mathcal{G}_k)$ between the farthest pair is given by:

$$D_{Gmax}(\mathcal{G}_l, \mathcal{G}_k) = \max_{\substack{i_l \in \mathcal{G}_l \\ j_k \in \mathcal{G}_k}} d(i_l, j_k) \quad (4)$$

Intragroup Distance

For any given group $\mathcal{G}_l$, the intragroup distance $D(\mathcal{G}_l)$ is given by:

$$D(\mathcal{G}_l) = \sum_{i \in \mathcal{G}_l} \left[ \sum_{j \in \mathcal{G}_l} d(i, j) \right] \quad (5)$$

Inter-Group Variation

Intergroup variation $V_{inter}(K)$ determines how spread apart/dissimilar UE groups are. For a given grouping with K number of groups, $V_{inter}(K)$ is given by:

$$V_{inter}(K) = \sum_{k=1}^{K} \left( \sum_{i \in \mathcal{G}_k} \sum_{j \notin \mathcal{G}_k} d(i, j) \right) \quad (6)$$

Intra-Group Variation

Intragroup variation $V_{intra}(K)$ measures the tightness of grouping within each group. For a given grouping with K number of groups, it is given by:

$$V_{intra}(K) = \sum_{k=1}^{K} D(\mathcal{G}_k) \quad (7)$$

Grouping Quality (GQ)

In example embodiments, a grouping quality (GQ) is determined, for quantifying the effectiveness of the grouping algorithm for the given number of groups $N_g$. This measure can be used to determine the optimal value of $N_g$, and, for example, to determine an optimal stopping criterion for grouping. An objective of UE grouping is to ensure that the users within a group are closer to each other in channel distance, whereas users across the group are farthest apart in terms of channel distance. Therefore, one measure of grouping effectiveness is provided by the Calinski and Harabasz (CH) index, which is defined as the ratio of inter-group variation to the intra-group variation. For example:

$$CH(K) = \frac{V_{inter}(K)/(K-1)}{V_{intra}(K)/(N-K)} \quad (8)$$

The optimal number of groups $N_g$ may be given by:

$$N_g = \arg \max_K CH(K) \quad (9)$$

The stopping criteria provides a rule to determine an optimal number of user groups, $N_g$, to be formed. If $N_g$ is already given, there is no need to specify a stopping criterion of this type.

Other examples of grouping effectiveness may use Gap Statistics, e.g. see R. Tibshirani, G. Walther, and T. Hastie, "Estimating the Number of Clusters in a Data Set Via the Gap Statistic," Journal of the Royal Stat. Soc. Series B., 2001

(A) User Grouping with Determination of Optimal Number of Groups:

In such a case, the grouping algorithm may perform the following steps:

(1) Initialize the Clusters as Singleton Sets

Initialization: $\mathcal{G}_1=\{1\}, \mathcal{G}_2=\{2\}, \ldots, \mathcal{G}_N=\{N\}$ $\mathbb{G}_N=\{\mathcal{G}_1, \ldots, \mathcal{G}_N\}$ (2) Choose the Appropriate Inter-Group Dissimilarity:
e.g. $D_G(\mathcal{G}_l, \mathcal{G}_k)$ (=$D_{Gmin}$, $D_{Gave}$ or $D_{Gmax}$)
(3) Run the Clustering Algorithms
for n=N:1
a. Compute $D_G(\mathcal{G}_l, \mathcal{G}_k) \forall l, k: \mathcal{G}_l, \mathcal{G}_k \in \mathbb{G}_n$
b. Find the pair of groups ($\mathcal{G}_{l^*}$, $\mathcal{G}_{k^*}$) for which the inter-group dissimilarity (=$D_{Gmin}$, $D_{Gave}$ or $D_{Gmax}$) is minimum, and less than an appropriate threshold.

$$(l^*, k^*) = \left\{(l, k): D_G(\mathcal{G}_l, \mathcal{G}_k) \leq \Gamma \text{ and } (l, k) = \arg\min_{\mathcal{G}_{l_1}, \mathcal{G}_{k_1} \in \mathbb{G}_n} D_G(\mathcal{G}_{l_1}, \mathcal{G}_{k_1})\right\}$$

If $(l^*, k^*) = \phi$, stop grouping
c. Merge $\mathcal{G}_{l^*}$ and $g_{k^*}$ into a single group: $\mathcal{G}_{l_1} = \mathcal{G}_{l^*} \cup \mathcal{G}_{k^*}$
d. The new set of groups formed $\mathbb{G}_{n-1} = \{\mathbb{G}_n \setminus \{\mathcal{G}_{l^*}, \mathcal{G}_{k^*}\}\} \cup \{\mathcal{G}_{l_1}\}$
e. Compute the CH index CH(n)
end (4) Choosing the Optimal Number of Groups
Choose the number of user groups to be $$N_g = \arg\max_n CH(n)$$

(B) User Grouping with a Fixed Pre-Determined Number of Groups:

In this scenario, the number of user groups, $N_g$, is fixed. The following grouping algorithm may be used:

(1) Define the set of user indices as $\mathcal{N} = \{1, \ldots, N\}$
(2) Initialization: initialization of cluster-heads
   a) Pick a random index $k_1 \in \mathcal{N}$. $\mathcal{G}_1 = \{k_1\}$
   b) For n=1: $N_g$−1;
   c) $\mathcal{N}_n = \mathcal{N} \setminus \{k_i, \ldots, k_n\}$ d) $k_{n+1} = \arg\max_{l \in \mathcal{N}_n} \left\{\min_{m=1,\ldots,n} d(l, k_m)\right\}$ e) $g_{n+1} = \{k_{n+1}\}$
End $\mathbb{G} = \{\mathcal{G}_1, \mathcal{G}_2, \ldots, \mathcal{G}_{N_g}\}$ (3) clustering with the number of clusters=$N_g$, and $\{k_1, \ldots, k_{N_g}\}$ as the cluster members
   a) Set the initial mean values (cluster heads) as
   b) define $\mathcal{N}^- = \{1, \ldots, N\} \setminus \{k_1, \ldots, k_{N_g}\}$ c) For $i \in \mathcal{N}^-$
   d) $\mathcal{G}^* = \{i\}$ e) $l = \arg\min_n D_G(\mathcal{G}^*, \mathcal{G}_n)$ % find the closest cluster for the given user
   f) $\mathcal{G}_l = \mathcal{G}_l \cup \mathcal{G}^*$ % assign the user to the closest cluster
End
   The user groups are given by the set
   $\mathbb{G} = \{g_1, g_2, \ldots, g_{N_g}\}$ (C) User Grouping with a Fixed Group Size:
This constraint can be handled by determining the number of groups $N_g$ as $$\left\lceil \left(\frac{N}{N_U}\right) \right\rceil,$$

(where N is the number of UEs to be grouped and $N_U$ is the constraint on the maximum group size) and applying the method B above (user grouping with a fixed pre-determined to number of groups). Note that we are trying to maximize the number of UEs per group, subject to the maximum users per group constraint to help improve performance, because the larger the number of UEs per group, the better the performance. The algorithm proceeds as per the above method B with the additional condition that the moment the number of UEs in a group reaches the maximum number of UEs per group constraint of $N_U$, then no more users can be added to the group.

To prevent the case where UEs that are allocated later from not being grouped with its best set of UEs, we could additionally assign UEs in $\mathcal{N}^-$ to groups as per the order of $g^*$, where $g^*$ is given by $$\min_{\mathcal{G}^*} \min_n D_G(\mathcal{G}^*, \mathcal{G}_n).$$

We thus start with assigning UEs in the order of increasing minimum distance of the UEs to the already formed groups.

User Grouping with Overlap

In this case, in addition to starting with groups with singleton UEs, we also include all pairs of UEs that are within a threshold channel distance (CD) of each other. Thus we may define that the set of all groups $\mathbb{G}_{N'}$ with which we start the clustering procedure is as follows:

$\mathbb{G}_{N'} = \{g_1, \ldots, g_N\} \cup \{(UE_j, UE_k) : d(j,k) \leq \gamma\}$ The rest of the procedure of forming a smaller number of groups by merging groups close to each other is as before. However, we will now have a single UE occurring in multiple groups and with those set of UEs that have a close channel distance with each other. This allows us to limit the complexity of each joint processing operation, while allowing multiple such receiver operations to happen. These multiple joint processing operations can occur in parallel.

This approach of user grouping can be easily extended to include three or more UEs per initial grouping, as is clear from the above definition. In other embodiments, additional criteria, such as QoS requirements, MAC Scheduler metrics, etc., can be used to determine which UEs should be in multiple initial groups. UEs with higher QoS requirements (e.g., URLLC packets) or scheduler metrics may be allowed to be in more than one initial grouping so that they are given higher priority and ensure a larger chance of their packets being successfully decoded.

Optionally, the user grouping can be further refined based on the realized BLER (Block Error Rate) of the different groups. For instance, due to the channel estimation error, it is possible that the grouping may have been inappropriate. Therefore, the achieved BLER provides further inputs/information that can be used to fine-tune the user grouping to maximize the probability of successful decoding of the UEs' transmissions.

The advantages of the example embodiments are that we can perform joint reception of a smaller number of UEs such that the receiver processing (such as matrix inversions) is not prohibitively high. Yet, it allows us to gain from the benefits of joint reception. The method here performs iterative processing by decoding and cancelling the already successfully decoded UEs' signals. While operating parallel joint receivers, the technique makes sure that there is little or no overlap of the sets of UEs that are being jointly decoded in parallel. The actual joint reception technique may use schemes such as joint maximum likelihood detection, sphere decoding, joint MMSE-IRC, etc.

Figure 7:
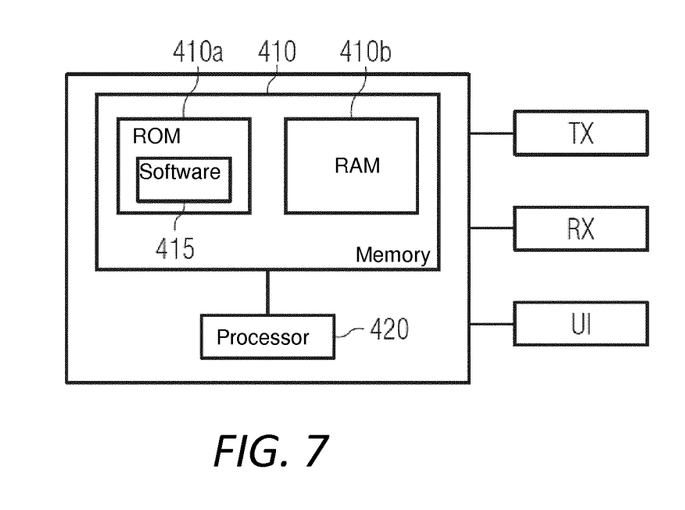
FIG. 7 is a block diagram of an apparatus according to an example embodiment.

FIG. 7 shows an apparatus according to an embodiment. The apparatus may be configured to perform the operations described herein, for example operations described with reference to any of FIG. 4 or FIG. 5. The apparatus may comprises at least one processor 420 and at least one memory 410 directly or closely connected to the processor. The memory 410 includes at least one random access memory (RAM) 410b and at least one read-only memory (ROM) 410a. Computer program code (software) 415 is stored in the ROM 410a. The apparatus may be connected to a receiver path of a base station in order to obtain respective signals. However, in some embodiments, the receiver signals are input as data streams into the apparatus. The apparatus may be connected with a user interface UI for instructing the apparatus and/or for outputting results. However, instead of by a UI, the instructions may be input e.g. from a batch file, and the output may be stored in a non-volatile memory. The at least one processor 420, with the at least one memory 410 and the computer program code 415 are arranged to cause the apparatus to at least perform at least the method according to FIG. 4 or FIG. 5 or any variation thereof as disclosed herein.

Figure 8:
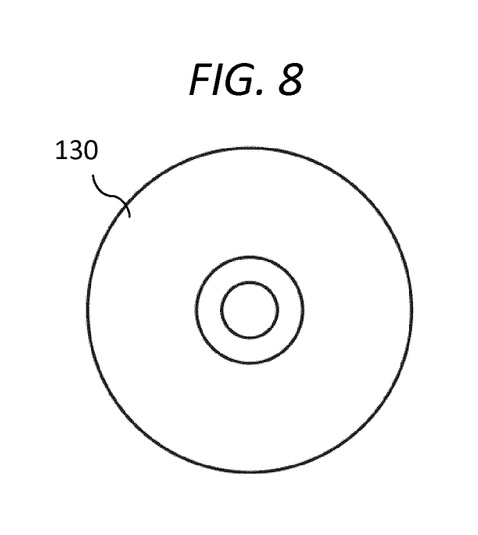
FIG. 8 shows a non-transitory media according to an example embodiment.

FIG. 8 shows a non-transitory media 130 according to some embodiments. The non-transitory media 130 is a computer readable storage medium. It may be e.g. a CD, a DVD, a USB stick, a blue ray disk, etc. The non-transitory media 130 stores computer program code, causing an apparatus to perform the method of any of FIG. 4 or FIG. 5, or any variation thereof as disclosed herein, when executed by a processor such as processor 420 of FIG. 7.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi. Accordingly, a base station may be a BTS, a NodeB, a eNodeB, a WiFi access point etc.

A memory may be volatile or non-volatile. It may be e.g. a RAM, a sram, a flash memory, a FPGA block ram, a DCD, a CD, a USB stick, and a blue ray disk. If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising: at least one processor; and at least one non-transitory memory including computer program code which, when executed with the at least one processor, causes the apparatus:
   to identify a plurality of user equipment, each transmitting one or more uplink data streams for decoding at a base station associated with a given cell of a radio network;
   to cluster the identified plurality of user equipment into joint processing groups, each joint processing group comprising the identities of two or more user equipment as clustered;
   to perform, in a first processing stage, joint processing of the uplink data streams for identified user equipment within common joint processing groups using one or more first processing algorithms to produce corresponding first processed uplink data streams; and
   to perform one or more subsequent processing stages on the first processed uplink data streams, subsequent to the joint processing, to produce decoded uplink data streams, the one or more subsequent processing stages using one or more second processing algorithms, different from the one or more first processing algorithms.

2. The apparatus of claim 1, wherein the one or more second processing algorithms for the one or more subsequent processing stages are computationally less intensive than the one or more first processing algorithms or that of a prior processing stage.

3. The apparatus of claim 1, wherein the one or more first processing algorithms comprise one or more interference mitigation algorithms for mitigating interference among the uplink data streams for user equipment within a common joint processing group.

4. The apparatus of claim 3, wherein the one or more interference mitigation algorithms comprise one or more of maximum likelihood algorithms or sphere decoding algorithms.

5. The apparatus of claim 1, wherein the one or more second processing algorithms comprise linear interference cancellation algorithms, the linear interference cancellation algorithms comprising one or more of maximal ratio combining (MRC), zero forcing (ZF), or minimum mean square error (MMSE).

6. The apparatus of claim 1, provided in a base station of a radio access network.

7. The apparatus of claim 1, provided in a cloud radio access network.

8. A method, comprising:
- identifying a plurality of user equipment, each transmitting one or more uplink data streams for decoding at a base station associated with a given cell of a radio network;
- clustering the identified plurality of user equipment into joint processing groups, each joint processing group comprising the identities of two or more user equipment as clustered;
- performing, in a first processing stage, joint processing of the uplink data streams for identified user equipment within common joint processing groups using one or more first processing algorithms to produce corresponding first processed uplink data streams; and
- performing one or more subsequent processing stages on the first processed uplink data streams, subsequent to the joint processing, to produce decoded uplink data streams, the one or more subsequent processing stages using one or more second processing algorithms, different from the one or more first processing algorithms.

9. The method of claim 8, wherein the one or more second processing algorithms for the one or more subsequent processing stages are computationally less intensive than the one or more first processing algorithms or that of a prior processing stage.

10. The method of claim 8, wherein the one or more first processing algorithms comprise one or more interference mitigation algorithms for mitigating interference among the uplink data streams for user equipment within a common joint processing group.

11. The method of claim 10, wherein the one or more interference mitigation algorithms comprise one or more of maximum likelihood algorithms or sphere decoding algorithms.

12. The method of claim 8, wherein the one or more second processing algorithms comprise linear interference cancellation algorithms, the linear interference cancellation algorithms comprising one or more of maximal ratio combining (MRC), zero forcing (ZF), or minimum mean square error (MMSE).

13. The method of claim 8, performed in a base station of a radio access network.

14. The method of claim 8, performed in a cloud radio access network.

15. An apparatus, comprising at least one processor, at least one non-transitory memory directly connected to the at least one processor, the at least one memory including computer program code, and the at least one processor, with the at least one memory and the computer program code being arranged to perform the method of claim 8.

16. A non-transitory computer readable medium comprising program instructions stored thereon for performing a method, comprising:
- identifying a plurality of user equipment, each transmitting one or more uplink data streams for decoding at a base station associated with a given cell of a radio network;
- clustering the identified plurality of user equipment into joint processing groups, each joint processing group comprising the identities of two or more user equipment as clustered;
- performing, in a first processing stage, joint processing of the uplink data streams for identified user equipment within common joint processing groups using one or more first processing algorithms to produce corresponding first processed uplink data streams; and
- performing one or more subsequent processing stages on the first processed uplink data streams, subsequent to the joint processing, to produce decoded uplink data streams, the one or more subsequent processing stages using one or more second processing algorithms, different from the one or more first processing algorithms.

17. The non-transitory computer readable medium of claim 16, wherein the one or more second processing algorithms for the one or more subsequent processing stages are computationally less intensive than the one or more first processing algorithms or that of a prior processing stage.

* * * * *